(12) United States Patent
Kallinen

(10) Patent No.: US 7,275,721 B2
(45) Date of Patent: Oct. 2, 2007

(54) ARRANGEMENT FOR GENERATING VORTEXES

(75) Inventor: Risto Kallinen, Halli (FI)

(73) Assignee: Patria Finavicomp Oy, Halli (FI)

( * ) Notice: Subject to any disclaimer, the term of this patent is extended or adjusted under 35 U.S.C. 154(b) by 518 days.

(21) Appl. No.: 10/977,478

(22) Filed: Oct. 29, 2004

(65) Prior Publication Data

US 2005/0230565 A1    Oct. 20, 2005

(30) Foreign Application Priority Data

Nov. 3, 2003    (FI)    ................................. 20031595

(51) Int. Cl.
B64C 21/10    (2006.01)
(52) U.S. Cl. .................. 244/200.1; 244/204; 244/213; 244/204.1; 244/211
(58) Field of Classification Search ............. 244/200.1, 244/204, 204.1, 198, 39, 200, 201, 213, 215
See application file for complete search history.

(56) References Cited

U.S. PATENT DOCUMENTS

| | | | |
|---|---|---|---|
| 3,578,264 A | 5/1971 | Kuethe | |
| 4,447,028 A | 5/1984 | Wang | |
| 4,615,497 A | 10/1986 | Seeler et al. | |
| 4,655,419 A | 4/1987 | van der Hoeven | |
| 5,054,720 A | 10/1991 | Page | |
| 5,253,828 A | 10/1993 | Cox | |
| 5,598,990 A * | 2/1997 | Farokhi et al. | .......... 244/200.1 |
| 5,755,408 A * | 5/1998 | Schmidt et al. | ............. 244/204 |
| 6,105,904 A * | 8/2000 | Lisy et al. | ............... 244/200.1 |
| 6,123,296 A * | 9/2000 | Mangalam | .................. 244/204 |
| 6,345,791 B1* | 2/2002 | McClure | ...................... 244/200 |
| 6,461,106 B1 | 10/2002 | Rahier | |
| 2001/0032907 A1 | 10/2001 | Borchers et al. | |

* cited by examiner

Primary Examiner—J. Woodrow Eldred
(74) Attorney, Agent, or Firm—Ladas & Parry

(57) ABSTRACT

A spoiler and wing of an aircraft. A bottom surface of the spoiler has several longitudinal, elongated grooves. At least some of the grooves are equipped with one or more vortex generators. Further, the invention relates to a wing having in its back part at least one flap and having at least one spoiler of the invention arranged on the section between the wing and flap. The invention also relates to a method and control surface for generating vortexes.

14 Claims, 5 Drawing Sheets

US 7,275,721 B2

ARRANGEMENT FOR GENERATING VORTEXES

BACKGROUND OF THE INVENTION

The invention relates to a spoiler of an aircraft, which comprises: a top surface and a bottom surface; a front edge and a back edge that reside on the longitudinal outer edges of the spoiler; and at least one hinge element for turning the spoiler relative to said hinge element from a low position to a high position and vice versa.

The invention further relates to a wing of an aircraft, which comprises: a front edge and a back edge; at least one movable flap at the back of the wing; at least one movable spoiler arranged on the front side of the flap, the spoiler comprising a top surface and a bottom surface; and at least one vortex generator for controlling airflows.

The invention also relates to a movable control surface of an aircraft, which comprises: a top surface and a bottom surface; a front edge and a back edge that reside on the longitudinal outer edges of the control surface; and at least one hinge element for moving the control surface relative to said hinge element.

In addition, the invention relates to a method for generating vortexes, in which method vortexes are generated on the top surface side of a wing of an aircraft by means of at least one vortex generator.

In aircrafts, such as airplanes, different movable flaps are used to control takeoffs and landings. The flap can be arranged on the trailing edge of the wing, and it can consist of several parts whose angularity and position in the longitudinal direction of the airplane can be changed. By means of the flap, airflows on the wing can be controlled during takeoffs and landings in such a manner that the upward force of the wing can be increased as necessary. This way, the takeoff speed and landing speed required by the airplane can be kept reasonable. One problem with the flaps is that airflow endeavors to leave the top surfaces of the flaps, which reduces the maximum upward force generated by the wing. To solve this problem, protruding vortex generators are arranged on the top surfaces of the wings to endeavor to generate on the top surface of the flap controlled vortexes which keep the airflow on the top surface of the flap. For instance U.S. Pat. No. 4,655,419 discloses vortex generators arranged on the top surface of the wing. A drawback with such protruding vortex generators is, however, that they also cause vortexes and air resistance during cruising. Further, U.S. Pat. No. 5,054,720 discloses an arrangement in which on the front edge of a flap at the back part of the wing there is a transverse section that serves as a vortex generator.

BRIEF DESCRIPTION OF THE INVENTION

It is an object of the invention to provide a novel and improved spoiler and control surface that are equipped with means for generating controlled vortexes. A further object of the invention is to provide a novel and improved wing that is equipped with a spoiler of the invention. Yet another object of the invention is to provide a novel method for generating controlled vortexes.

The spoiler of the invention is characterized in that there are several elongated grooves on the bottom surface of the spoiler, which are arranged substantially longitudinally to the spoiler, and that at least some of the grooves are equipped with at least one vortex generator.

The wing of the invention is characterized in that there are several elongated grooves on the bottom surface of the spoiler, which are arranged substantially longitudinally to the spoiler, and that at least some of the grooves are equipped with at least one vortex generator.

The control surface of the invention is characterized in that on at least one of the control surface surfaces, there are several elongated grooves arranged substantially longitudinally to the control surface, and that at least some of the grooves are equipped with at least one vortex generator.

The method of the invention is characterized by directing, during the landing of an aircraft, part of the airflow below the wing through a gap between the back edge of the wing and the flaps to the top surface side of the wing, and generating controlled vortexes in the airflow flowing through the gap.

The essential idea of the invention is that there are several elongated grooves on the surface of the spoiler or control surface, which grooves are arranged longitudinally to the spoiler or control surface. During use, the grooves are parallel to the airflow encountered by the wing. Further, at least some of the grooves are equipped with one or more vortex generators to control the airflow.

The invention provides the advantage that the grooves and vortex generators on the bottom surface of the spoiler are protected by the wing structures during cruising and, thus, do not cause air resistance during cruising. Only after the flaps are driven from the cruising position to the landing position, the grooves and vortex generators start to generate controlled vortexes in the airflow through the gap between the back portion of the wing and the flaps.

An essential idea of one embodiment of the invention is that the vortex generator is arranged to the groove in such a manner that it is entirely in the portion between the spoiler bottom surface and groove bottom and, thus, does not extend outside the bottom surface of the spoiler. This way, there is no need to reserve space for the vortex generators in the wing structures.

An essential idea of one embodiment of the invention is that the spoiler comprises grooves substantially along the entire bottom surface.

An essential idea of one embodiment of the invention is that the cross-sectional shape of the groove is made up of one or more curved sections.

An essential idea of one embodiment of the invention is that the cross-sectional shape of the groove is asymmetric.

An essential idea of one embodiment of the invention is that the direction of the centre axis of the groove differs from the direction of the airflow encountered by the wing.

BRIEF DESCRIPTION OF THE FIGURES

The invention is described in greater detail in the attached drawings, in which.

In the figures, the invention is shown in a simplified manner for the sake of clarity. Similar parts are marked with the same reference numbers in the figures where possible.

DETAILED DESCRIPTION OF SOME EMBODIMENTS OF THE INVENTION

Figure 1:
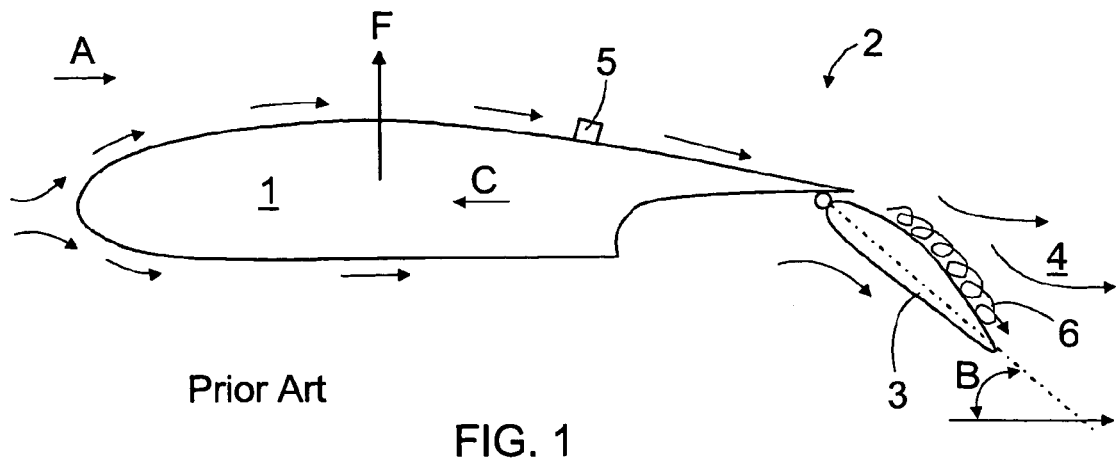
FIG. 1 is a schematic view of a wing according to the prior art and the travel of airflows past such a wing.

FIG. 1 shows a wing 1 with a front edge and a back edge. A flap 3 on the back edge 2 is turned to its low position. When the intersecting angle B of the flap 3 and airflow A is large, the airflow on the top surface side of the wing 1 easily leaves the top surface of the flap 3, which reduces the maximum upward force F of the wing 1. FIG. 1 illustrates the leaving airflow with arrows 4. The leaving of the topside airflow can be delayed by arranging protruding vortex generators 5 on the wing to generate on the top surface side of the flap 3 controlled vortexes 6 that prevent the topside airflow from leaving the top surface at large intersecting angles. The direction of flight of the aircraft is marked with arrow C in the figure.

Figure 2:
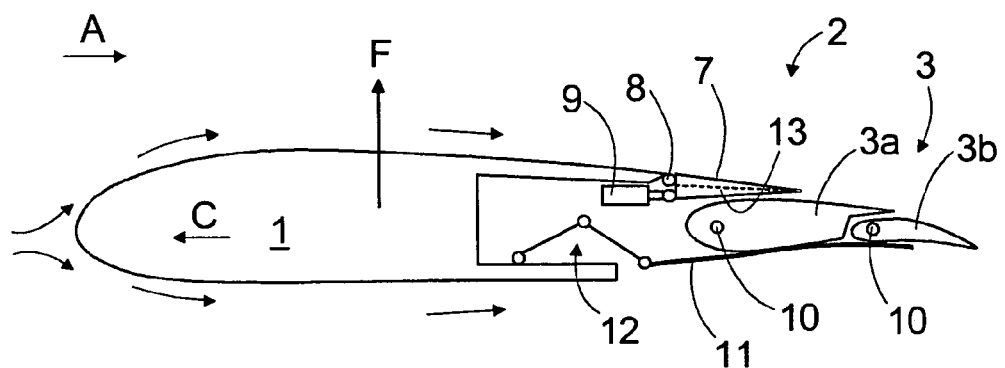
FIG. 2 is a schematic view of a wing in cruising position and equipped with a spoiler of the invention.

FIG. 2 shows a wing 1 equipped with a spoiler 7 of the invention. The spoiler 7 may have a predefined surface area and it may be arranged on the section between the back part of the wing 1 and the flaps 3 on the top surface side of the wing 1. There may be one or more spoilers 7 depending on the dimensions of the wing 1 and the flaps 3, for instance. The spoiler 7 may be connected by a hinge 8 to the wing 1 so that it can by means of a suitable actuator 9, such as a pressure medium-operated cylinder, be turned from the low position to the top position. In FIG. 2, the flap 3 is shown in its retracted position and in FIG. 3, the flap 3 is driven out to its full measure. There may be several flaps 3, and each flap 3a, 3b may be arranged by means of a joint 10 so that the intersecting angle B of each flap 3a, 3b may be separately adjusted. Further, the flaps 3a, 3b may be connected to a support rail 11 or a corresponding structure that can be moved by a suitable control mechanism 12 to move the flaps 3a, 3b in and out. The control mechanism 12 may comprise a joint mechanism, for instance, and have one or more pressure medium-operated actuators. For the sake of clarity, FIGS. 2 and 3 show the flaps 3a, 3b and the means used to move them in a very simplified manner.

Figure 3:
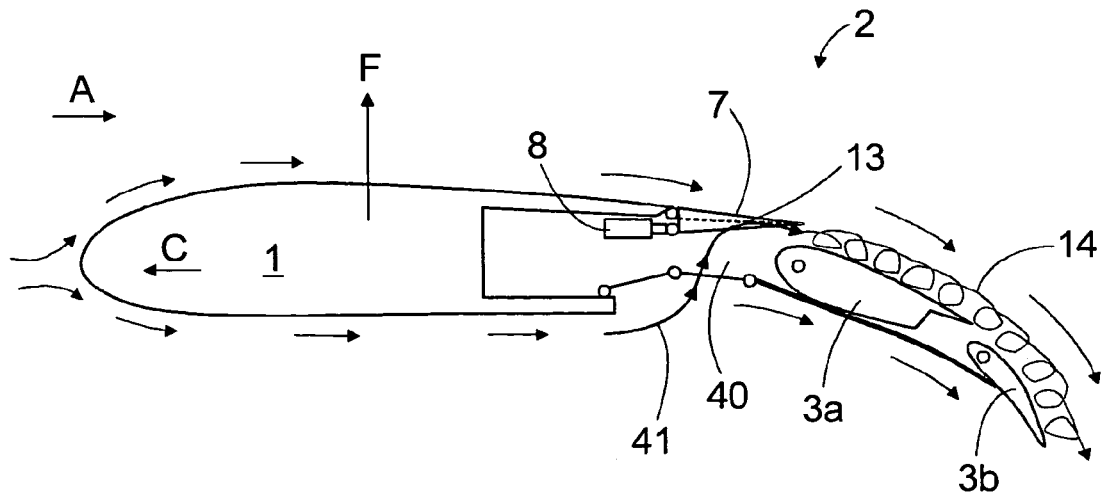
FIG. 3 is a schematic view of the wing of FIG. 2 in a situation where the flaps are in their outmost position.

In FIG. 3, the flaps 3a and 3b are driven to their outmost position, whereby at least one gap 40 forms between the back part of the wing 1 and the flap 3a. Part of the airflow below the wing 1 then flows through the gap 40 between the spoiler 7 and flap 3a to the top surface side of the wing 1. The airflow passing through the gap 40 is marked with reference number 41. According to the idea of the invention, several grooves 13 have been formed on the bottom surface side of the spoiler 7. In FIG. 3, the grooves 13 are illustrated by a dashed line. Each groove 13 or alternatively at least some of the grooves 13 are equipped with a vortex generator so that a vortex is generated in the airflow flowing through the gap between the spoiler 7 and flap 3a. Because there are several grooves 13 side by side, they can form a kind of vortex layer 14 on the top surface of the flaps 3a, 3b. This way, the topside airflow 15 stays better on the top surface of the flaps 3a, 3b, and a higher maximum upward force is achieved. For the sake of clarity, FIGS. 2 and 3 do not show the vortex generators arranged in the grooves 13.

Figure 4:
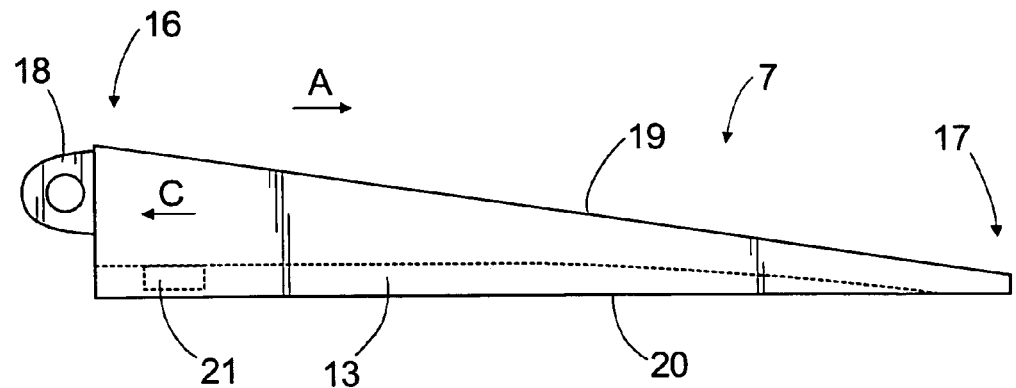
FIG. 4 is a schematic side view of a spoiler of the invention.

FIG. 4 shows a spoiler 7 of the invention from the side. As seen from the direction of airflow A, i.e. in the longitudinal direction of the spoiler 7, the spoiler 7 has a front edge 16 and a back edge 17. The spoiler 7 may be thicker at the front edge 16 than at the back edge 17, whereby the spoiler 7 has a wedge-like shape. The spoiler 7 may be arranged turnable relative to a hinge 8. The hinge 8 may have one or more lugs 18 that may be arranged on the front edge 16 of the spoiler 7. Alternatively, the hinge parts may be integrated to the structure of the spoiler 7. The spoiler 7 further has opposing top 19 and bottom 20 surfaces. The top surface 19 may be a substantially even planar surface. The bottom surface 20 may in turn have several adjacent grooves 13. The grooves 13 are arranged parallel to the longitudinal direction of the spoiler 7, which means that their position in the aircraft is substantially in the direction of the airflow A. There may be one or more vortex generators 21 arranged in a groove 13. The vortex generators 21 may reside in the front part 16 of the spoiler 7. A groove 13 may extend from the front edge 16 of the spoiler 7 to the back edge 17. However, the structure of the back edge 17 is typically relatively thin so the grooves 13 can be dimensioned to end at a distance from the back edge 17.

Figure 5:
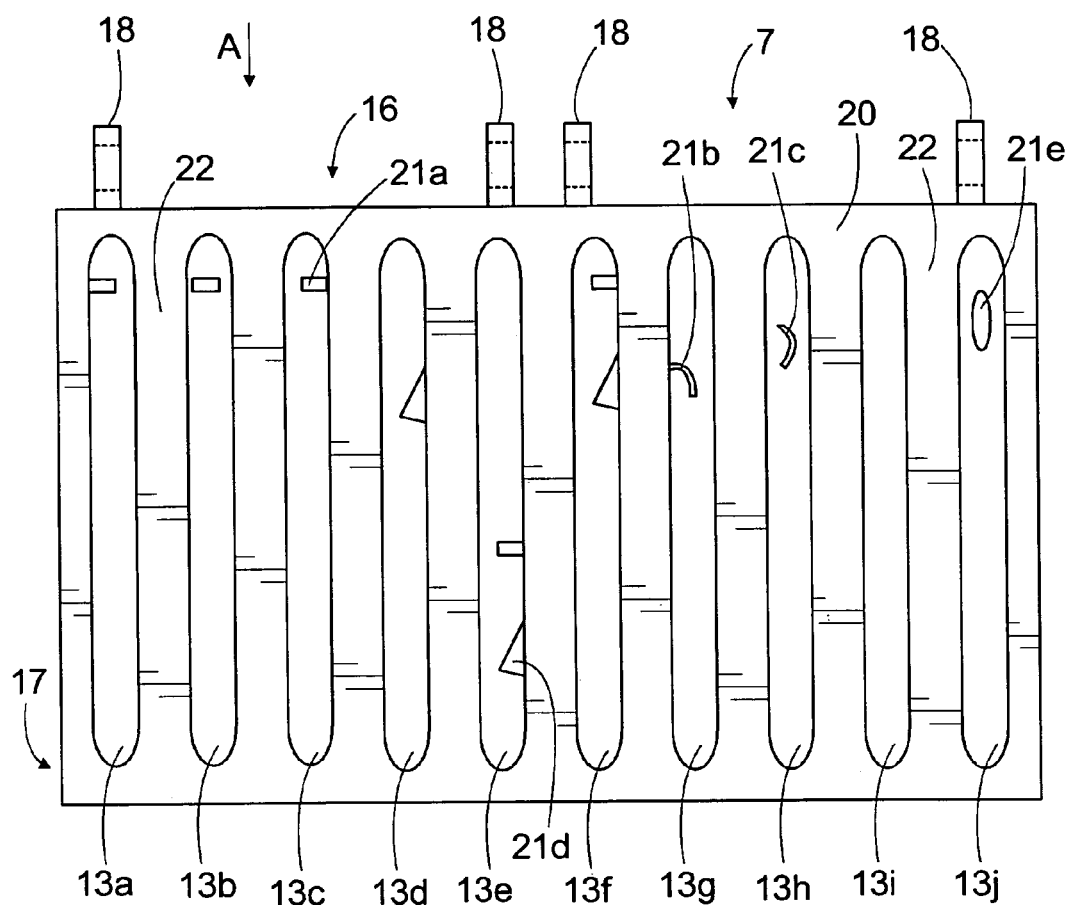
FIG. 5 is a schematic bottom view of a second spoiler of the invention.

In FIG. 5, the spoiler 7 is shown as seen from the bottom surface 20 side. There may be several parallel grooves on the bottom surface 20 of the spoiler 7 at a distance from each other so that there is an area 22 of a desired size between the adjacent grooves 13. As FIG. 5 reveals, vortex generators 21a to 21e of various constructions can be arranged in the grooves 13. Further, there may be several different vortex generators arranged into one groove 13, as shown in grooves 13e and 13f. In some cases, a groove 13i or some of the grooves may be completely without a vortex generator 21. By the selection of the structure of the vortex generator 21, by the number of vortex generators, and by combining different vortex generators, it is possible to influence the vortex layer 14 produced by the spoiler 7. The generation of vortexes is also influenced by the location of the vortex generator 21 in the groove 13. The vortex generator 21 may reside on one side of the groove 13, on both sides, or at the bottom of the groove. Further, the vortex generator 21 may be arranged on the front edge 16 section of the spoiler 7, on the back edge 17 section, or on some suitable section between the front edge 16 and back edge 17.

Figure 6:
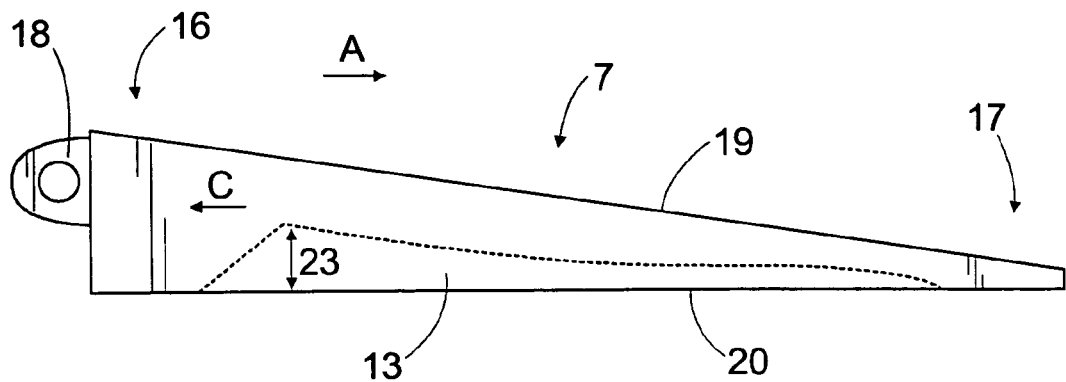
FIG. 6 is a schematic side view of a third spoiler of the invention.

FIG. 6 shows from the side an application of the spoiler 7 of the invention. The depth 23 of the groove 13 need not be constant, and the groove 13 may comprise sections having different depths as seen in the longitudinal direction of the spoiler 7. The depth 23 of the groove 13 may, for instance, be deeper on the front edge 16 section of the spoiler than on the back edge 17 section. Further, the depth may increase or decrease linearly. Alternatively, the changes in depth 23 may be stepwise or follow a suitable arched curve.

Figure 7:
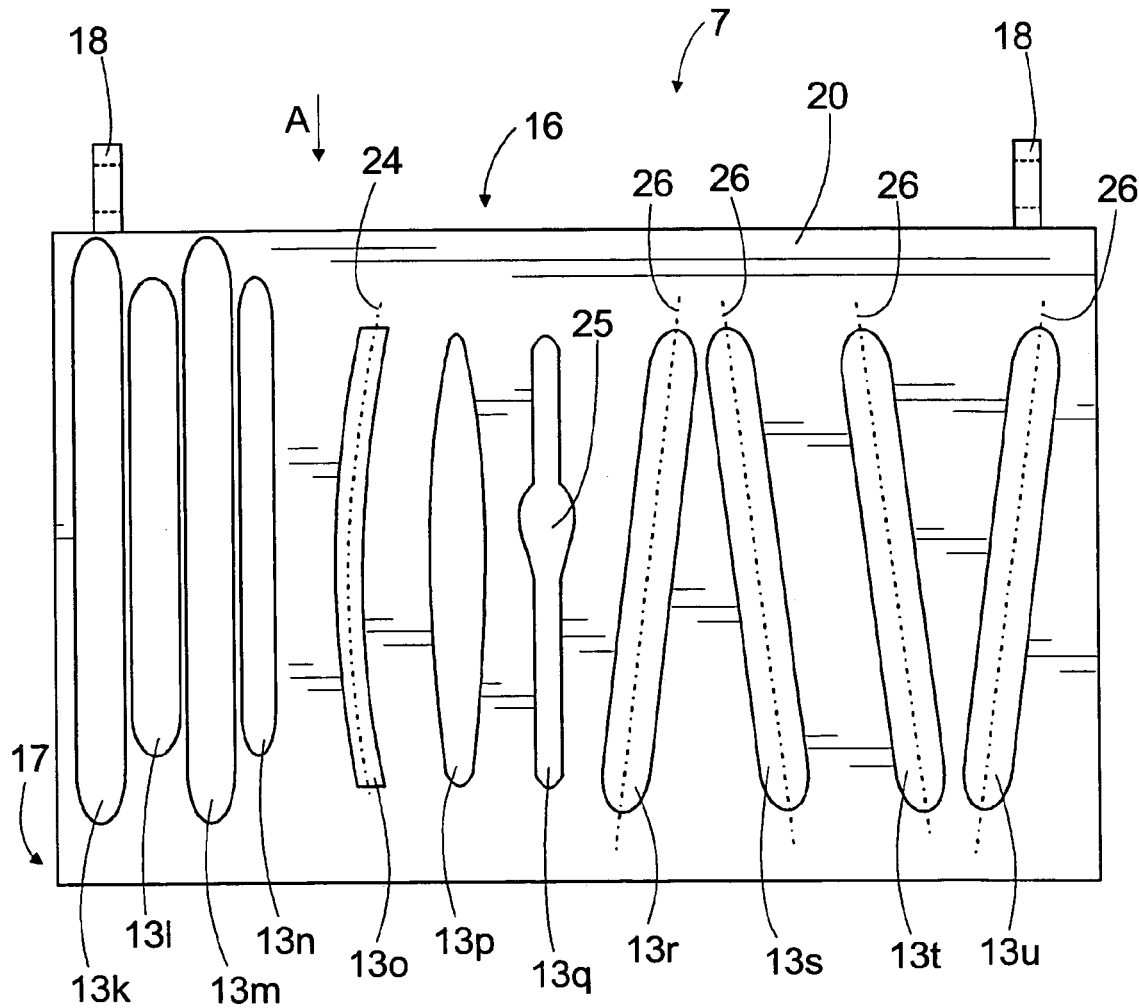
FIG. 7 is a schematic view of a few possible groove embodiments seen from the bottom surface side of the spoiler.

FIG. 7 shows a few possible groove 13 shapes and placements on the bottom surface 20 of the spoiler 7. For the sake of clarity, the figure does not show the vortex generators 21 in the grooves 13. The vortex generators 21 shown in the earlier figures or any other vortex generator known per se in the field can be used in the grooves 13 shown in FIG. 7. In the spoiler 7 of the invention, it is also possible to use movable vortex generators that can be moved for instance by means of a pressure medium, electrically, or mechanically to their operating position to generate vortexes, and correspondingly, to their idle position in which they do not generate vortexes.

As illustrated in FIG. 7, adjacent grooves 13k to 13n may be of different lengths. In addition, the widths of adjacent grooves may differ like those of grooves 13m and 13n, for instance. The groove can also be curved, such as groove 13o. The centre axis of such a groove 13o is curved as seen from the longitudinal direction of the spoiler 7. The width of the groove may also vary along its length. The middle part of groove 13p is wider than its ends. Groove 13q in turn comprises a wider section 25 at a predefined point. It is also possible to align the grooves so that adjacent grooves are at a desired angle to each other. The centre axes 26 of grooves 13r and 13s are in the front section 16 of the spoiler 7 closer to each other than in the back section 17 of the spoiler 7. In the case of grooves 13t and 13u, the situation is the opposite.

Figure 8:
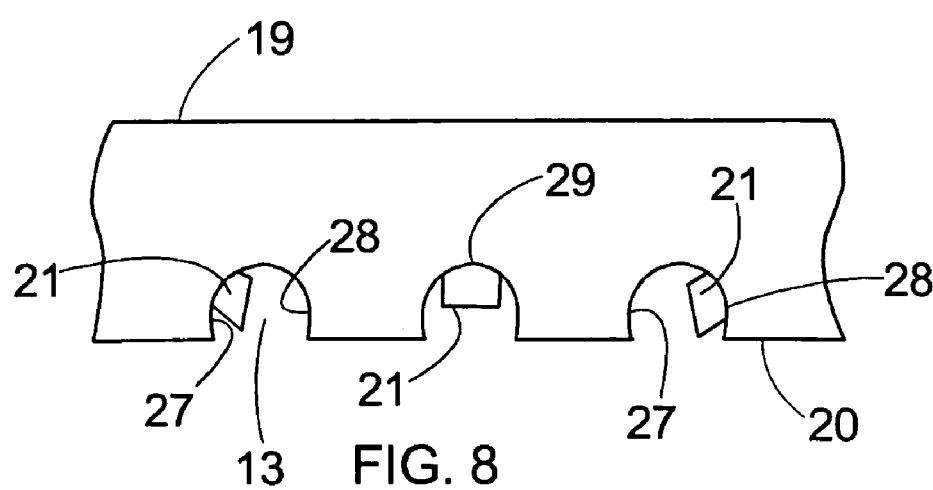
FIG. 8 is a schematic view of a possible cross-sectional shape of the groove and the placement of the vortex generator in the groove as seen in the longitudinal direction of the spoiler.

FIG. 8 shows a section of the structure of a spoiler 7. The bottom surface of the spoiler 7 has grooves 13, the cross-sectional shape of which is substantially semicircular. The figure also shows different alternatives for the placement of the vortex generator 21. The vortex generator 21 can be placed on the first side 27 of the groove 13, the second side 28 or at the bottom 29. If one groove 13 has several vortex generators 21, they may be arranged either on the same surface of the groove 13 or each one may be arranged on a different surface.

Figure 9:
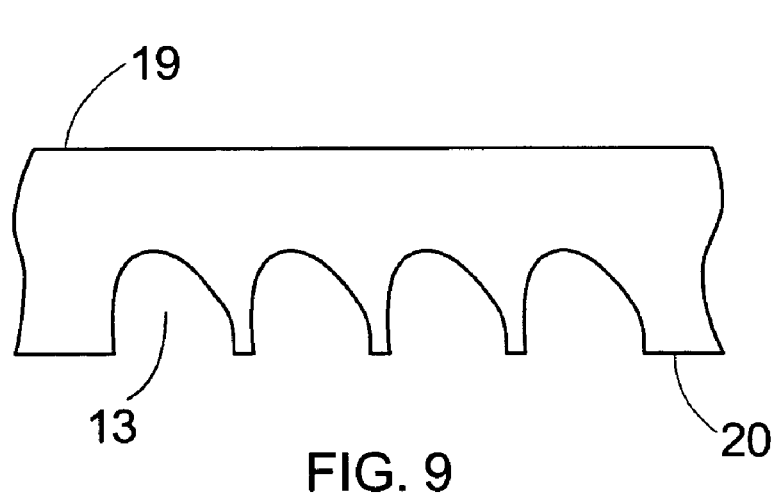
FIG. 9 is a schematic view of a second cross-sectional shape of the groove as seen in the longitudinal direction of the spoiler.

Grooves 13 with an asymmetric cross-sectional shape are formed on the bottom surface 20 of the spoiler 7 shown in FIG. 9. The groove 13 may consist of several curve sections having a different radius of curvature. For the sake of clarity, FIG. 9 does not show vortex generators 21.

Figure 10:
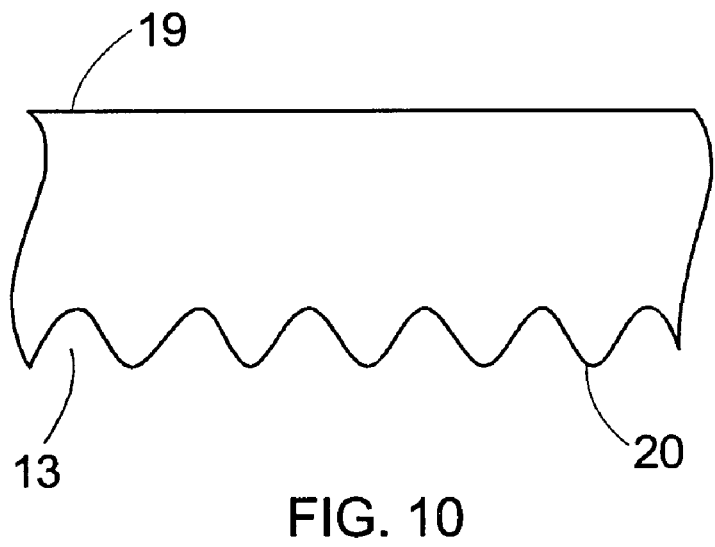
FIG. 10 is a schematic longitudinal view of a spoiler equipped with a corrugated bottom surface.

The bottom surface 20 of the spoiler 7 shown in FIG. 10 is corrugated at one or more predefined points. Alternatively, the entire bottom surface 20 of the spoiler is corrugated. For the sake of clarity, FIG. 10 does not show vortex generators 21.

Figure 11:
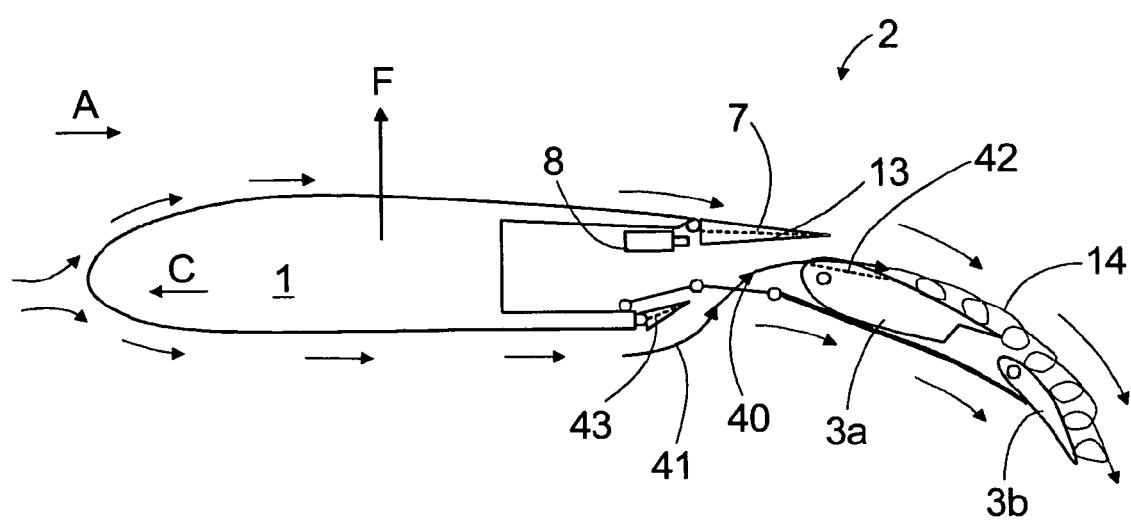
FIG. 11 is a schematic view of a wing with a first flap equipped with the vortex generators of the invention.

FIG. 11 shows a wing 1 having a first flap 3a in the back part thereof equipped with the grooves and vortex generators of the invention to generate controlled vortexes in the airflow 41 flowing through the gap 40. The grooves 42 can be formed on the front part of the flap 3a, in which case they are protected by the wing 1 structures during cruising. The spoiler 7 can cover the grooves 42. Further, it is possible to arrange one or more other control surfaces on the wing 1 to guide airflows. Arranged at the gap 40, there may, for instance, be a cover plate 43 which may also have grooves equipped with vortex generators according to the invention to affect the airflow 41. The cover plate 43 or the like may be movable or fixed. The cover plate 43, spoiler 7, and flap 3a are, thus, control surfaces of a kind that affect the airflow 41 with their grooves and vortex generators. The control surfaces may be equipped with grooves and vortex generators of the type described above. Different combinations of control surfaces are also possible.

All in all, there are many different alternatives for the design and placement of the grooves 13. In addition, different groove shapes can be combined to achieve the desired aerodynamic properties.

It should be mentioned that the invention could be applied to wings, control surfaces, and flaps having different operating principles and constructions than those presented in this application by way of example.

The drawings and the related description are only intended to illustrate the idea of the invention. The invention may vary in detail within the scope of the claims.

What is claimed is:

1. A spoiler of an aircraft, which comprises:
   a top surface and a bottom surface;
   a front edge and a back edge that reside on the longitudinal outer edges of the spoiler;
   at least one hinge element for turning the spoiler relative to said hinge element from a low position to a high position and vice versa;
   several elongated grooves on the bottom surface of the spoiler, which are arranged substantially longitudinally to the spoiler, and wherein
   at least some of the grooves are equipped with at least one vortex generator.

2. The spoiler as claimed in claim 1, wherein each groove is equipped with at least one vortex generator.

3. The spoiler as claimed in claim 1, wherein adjacent grooves are parallel.

4. The spoiler as claimed in claim 1, wherein adjacent grooves are parallel and the sides of adjacent grooves abut.

5. The spoiler as claimed in claim 1, wherein adjacent grooves are parallel and the centre lines of adjacent grooves form a predefined angle to each other.

6. The spoiler as claimed in claim 1, wherein the cross-sectional shape of the groove is made up of one or more curved sections.

7. The spoiler as claimed in claim 1, wherein the cross-sectional shape of the groove is asymmetric and consists of several curved sections having a different radius of curvature.

8. The spoiler as claimed in claim 1, wherein the cross-section of the groove is substantially constant throughout the length of the groove.

9. The spoiler as claimed in claim 1, wherein the cross-sectional shape of the groove is arranged to change in the longitudinal direction of the groove, whereby the groove comprises sections that differ in their cross-sectional area.

10. The spoiler as claimed in claim 1, wherein the vortex generator is arranged in the groove so that it resides in its entirety in the section between the bottom surface and top surface of the spoiler.

11. The spoiler as claimed in claim 1, wherein the groove comprises two opposing sides and a bottom between them, and at least one side comprises at least one vortex generator.

12. A spoiler as claimed in claim 1, wherein the groove comprises two opposing sides and a bottom between them, and
    at least one vortex generator is arranged at the bottom of the groove.

13. A wing of an aircraft, which comprises:
    a front edge and a back edge;
    at least one movable flap at the back of the wing;
    at least one movable spoiler arranged on the front side of the flap, the spoiler comprising a top surface and a bottom surface;
    at least one vortex generator for controlling airflows;
    several elongated grooves on the bottom surface of the spoiler, which are arranged substantially longitudinally to the spoiler, and wherein
    at least some of the grooves are equipped with at least one vortex generator.

14. A movable control surface of an aircraft, which comprises:
    a top surface and a bottom surface;
    a front edge and a back edge that reside on the longitudinal outer edges of the control surface;
    at least one hinge element for moving the control surface relative to said hinge element;
    on at least one surface of the control surface, there are several elongated grooves arranged substantially longitudinally to the control surface, and wherein
    at least some of the grooves are equipped with at least one vortex generator.

* * * * *

UNITED STATES PATENT AND TRADEMARK OFFICE
CERTIFICATE OF CORRECTION

PATENT NO.       : 7,275,721 B2  
APPLICATION NO.  : 10/977478  
DATED            : October 2, 2007  
INVENTOR(S)      : Risto Kallinen Page 1 of 1

It is certified that error appears in the above-identified patent and that said Letters Patent is hereby corrected as shown below:

On title page, item 73, "Finavicomp" should read -- Aerostructures --.

Signed and Sealed this

Twenty-fourth Day of June, 2008

JON W. DUDAS  
*Director of the United States Patent and Trademark Office*